United States Patent
Nakaya et al.

[11] Patent Number: 5,949,484
[45] Date of Patent: Sep. 7, 1999

[54] PORTABLE TERMINAL APPARATUS FOR MULTIMEDIA COMMUNICATION

[75] Inventors: Yuichiro Nakaya, Tokyo; Yukio Fujii, Yokohama; Minoru Nagata, Kodaira; Masanori Maruyama, Tokorozawa, all of Japan

[73] Assignee: Hitachi, Ltd., Tokyo, Japan

[21] Appl. No.: 08/913,161

[22] PCT Filed: Mar. 8, 1995

[86] PCT No.: PCT/JP95/00376

§ 371 Date: Sep. 8, 1997

§ 102(e) Date: Sep. 8, 1997

[87] PCT Pub. No.: WO96/27987

PCT Pub. Date: Sep. 12, 1996

[51] Int. Cl.$^6$ ............................. H04N 7/12; H04M 11/00
[52] U.S. Cl. .......................... 348/384; 348/14; 455/38.3; 455/574
[58] Field of Search .............................. 348/14, 384, 390, 348/411, 412, 413, 414; 455/38.3, 574

[56] References Cited

U.S. PATENT DOCUMENTS

| | | | |
|---|---|---|---|
| 5,485,504 | 1/1996 | Ohnsorge | 348/14 |
| 5,491,507 | 2/1996 | Umezawa | 348/14 |

FOREIGN PATENT DOCUMENTS

| | | |
|---|---|---|
| 6-141089 | 5/1994 | Japan . |
| 06334998 | 12/1994 | Japan . |

OTHER PUBLICATIONS

International Telecommunication Union, ITU–T Recommendation H.261, Previously "CCITT Recommendation"), "Line Transmission of Non–Telephone Signals", "Video Codec for Audiovisual Services at p × 64 kbits", Mar. 1993.
ISO/IEC 11172-2: 1993 (E).
ISO/IEC 13818-2: 1995 (E).

*Primary Examiner*—Howard Britton
*Attorney, Agent, or Firm*—Antonelli, Terry, Stout & Kraus, LLP

[57] ABSTRACT

The electric power consumption by a terminal used for communication of multimedia information is controlled by changing the quality of transmitted information. The terminal is provided with input (101, 102, 106 and 107) through which such information as images and sounds is inputted, channel control sections (123 and 124) which output the input information to channels and receive information from the channels, output (103, 104, 108, 109 and 105) which output the information received from the channels in the form of images, sounds, etc., a codec (110) which is provided between the input and output and the control sections, encodes the input information in one of multiple encoding modes in which electric power is differently consumed, and decodes the information inputted from the channels, and a control section (133) which controls the selection of the encoding mode. This terminal can continue information communication for a required period of time at minimum power consumption at the sacrifice of the quality of transmitted information. Therefore, either the power consumption or quality of information can be adequately selected according to the transmission.

20 Claims, 8 Drawing Sheets

PORTABLE TERMINAL APPARATUS FOR MULTIMEDIA COMMUNICATION

TECHNICAL FIELD

The present invention relates to a multimedia communication terminal apparatus having a plurality of encoding modes with different power consumption. In the present invention, a change in the encoding mode indicates a change of a terminal state in which a transmitted encoding bit stream is changed even when the same input information source (e.g., images inputted to a camera, sounds inputted to a microphone, etc.) is supplied to a terminal. Moreover, according to the present invention, a terminal for executing a communication of single information such as sounds or the like also is included in the multimedia communication terminal.

BACKGROUND ART

Multimedia communication terminals which can perform digital image communication have been popularized really. As a main factor for putting digital image communication into a practice, there can be enumerated a progress of image information compression technique (image coding technique) in addition to the development of electronic device technique. Image encoding technique is a technique for compressing image information having an information amount 1000 times as large as that of audio information to the level such that image information can be transmitted/stored. When a digital image communication using image encoding techniques is carried out, a terminal on the transmission side encodes (compresses), transforms inputted image information into an encoded bit stream, and transmits the encoded bit stream. A terminal on the reception side obtains a decoded image by decoding a received bit stream. At that time, in order to correctly carry out the communication, terminals located on both ends of the channel have to use a common image encoding system. To this end, as an international standard, there are now determined standard image encoding systems such as H. 261, MPEG1 or MPEG2. It is expected that much more standard image encoding systems will be determined from now on in accordance with new applications such as a wireless image communication.

Most of image communication terminals that were already commercially available on the market are wired image communication terminals connected to an ISDN network line or the like. However, it is expected that wireless image communication terminals which can provide similar functions will become widespread in the future wireless networks. The wireless communication terminal is featured in its portability, and it is customary that the wireless communication terminal uses a storage battery as its electric power source. However, an amount of an electric power that a light-weight storage battery used by the portable terminal can supply is limited so that a power consumption of a terminal has to be suppressed in order to prolong a continuous communication time. Also, since a surveillance system or the like uses a large number of terminals, even when a storage battery is not in use, it is important to suppress the power consumption. While the saving of the electric power becomes an important condition depending on applications as described above, an image encoding algorithm having a high information compression ratio has a large amount of calculations, and a power consumption tends to increase. In general, it is a first object for the image encoding to increase an information compression ratio, and a problem of a power consumption is not regarded as being important. However, in the future in which terminals for multimedia communication will become widespread and the problem of the power consumption that has been regarded as being unimportant will hold an important position in the design and development of apparatus.

In order to save an electric power of commercially-available portable apparatus, notebook-type (laptop) computers had created some devices. Main power-saving functions of Macintosh Power Book 18C manufactured by Apple Computer Inc., USA are as follows:

(a) When a battery remaining amount becomes lower than a constant amount, a backlight of a liquid-crystal display is automatically darkened;

(b) When a battery remaining amount becomes lower than a certain constant level, an alarm message is displayed on a display;

(c) If a laptop computer, which is being energized, is left inoperative during a predetermined period of time, then it is automatically placed in a sleep mode (state in which all functions except for holding the memory contents of RAM are stopped);

(d) A user can switch a clock frequency of a CPU, and it becomes possible to save an electric power by lowering a processing speed; and (e) When a CPU is not requested in processing during a predetermined time, a clock frequency of the CPU is lowered automatically. Such a countermeasure for decreasing a power consumption in the laptop computer causes a display screen to become difficult to see and also causes a processing speed to be lowered. However, in general, the content of processing itself and provided information itself (e.g., information itself to be displayed on the display screen) are not changed.

In general, since an encoding algorithm having a high information compression ratio executes a complex processing, a processing amount (calculation amount) tends to increase. As the calculation amount increases, a power consumption also is caused to increase. For example, in a terminal for multimedia communication having a storage battery as an electric power source or a communication terminal in which a power consumption has to be decreased, a continuous communication time is as a result reduced.

Therefore, an object of the present invention is to provide a communication terminal in which a power consumption can be saved and a necessary continuous communication time can be maintained. In particular, it is an object of the present invention to provide a communication terminal in which a power consumption can be decreased by changing the encoding mode.

DISCLOSURE OF INVENTION

In order to attain the above-mentioned objects, in a communication terminal according to the present invention, in image information or audio information having a plurality of different encoding modes, a power consumption is controlled by switching the encoding mode into a mode requested by a system or from the outside.

Figure 1:
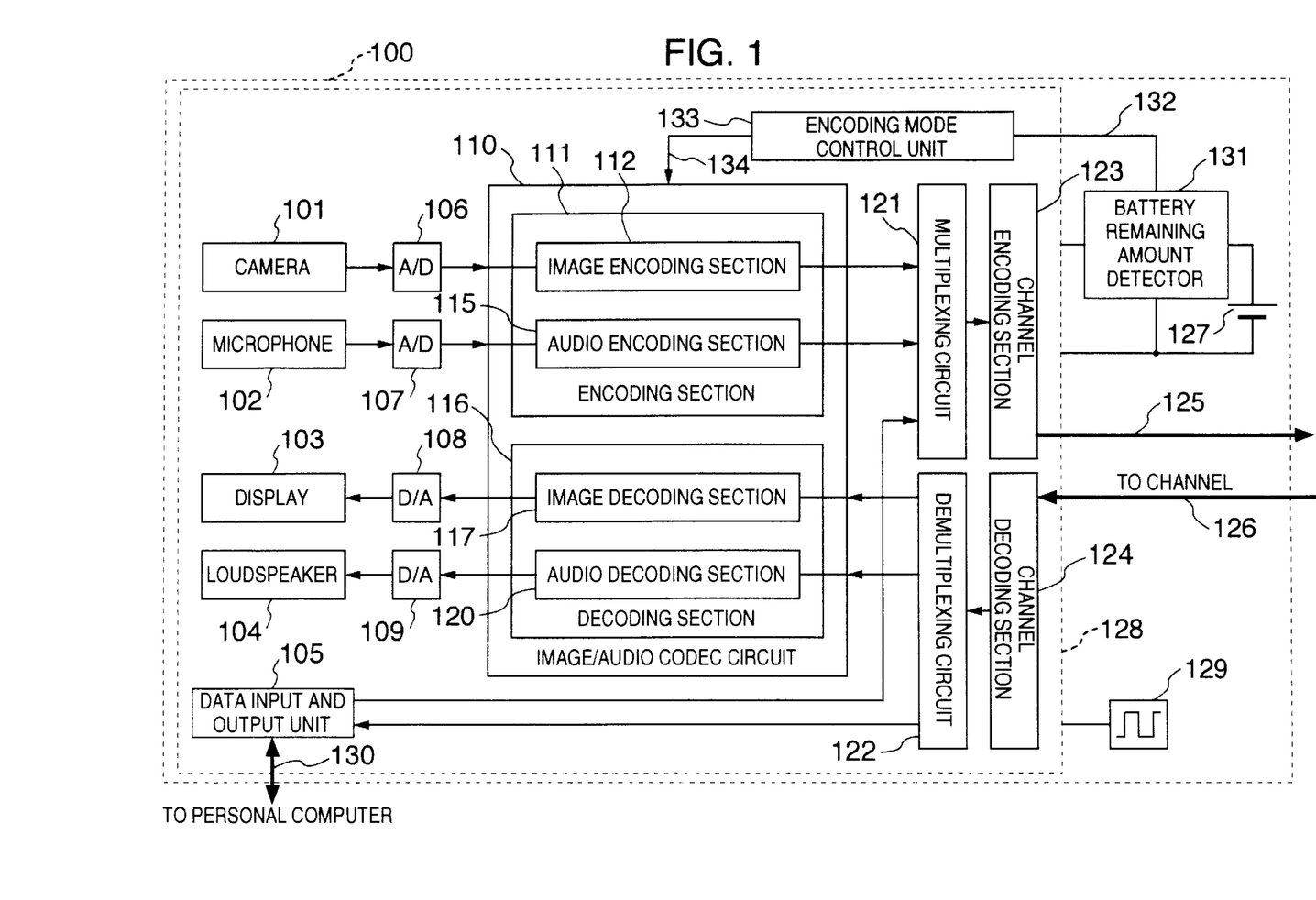
FIG. 1 is a block diagram showing an example of a terminal for multimedia communication.

In a communication terminal apparatus in which inputted image or audio information is encoded and outputted to a channel and image or audio information obtained from the transmission line is decoded, a specific communication terminal apparatus according to the present invention comprises input means (101, 102, 106, 107) for inputting image or video information, channel control sections (123, 124) for outputting the inputted information to a channel and inputting information from the channel, output means (103, 104, 108, 109, 105) for outputting information obtained from the channel by images, sounds or the like, a codec means (110) disposed among the input means, the output means and the channel control sections for encoding the inputted information in accordance with any encoding mode of a plurality of encoding modes with different power consumption upon execution and decoding information inputted from the channel and a control section (133) for controlling the selection of the encoding modes.

In order to reduce the power consumption of the communication terminal apparatus much more, the quality of transmitted information, for example, is controlled. It is provided with means for switching the encoding mode automatically or in a manual fashion in order to control the quality of the transmitted information. During a period in which a communication is being made, it is possible for the communicated party to switch the encoding mode. It is effective to provide with means for monitoring a battery remaining amount of a storage battery used for an electric power source and means for presenting a standard of a continuous communication possible time obtained when the mode is used at every encoding mode to the person who executes the switching of the encoding mode and to switch the encoding mode at a proper timing. Also, it is provided with means for selecting an encoding mode with a small power consumption in accordance with a decrease of a detected battery remaining amount. Further, it is effective to provide with means for stopping a clock signal to be supplied to circuits which became unnecessary by switching the encoding mode. With respect to the clock signal, it is effective to provide with means for much more lowering a frequency of a clock signal to be supplied to an encoding circuit as the processing amount of the operated encoding mode becomes smaller. It is effective to provide with means for controlling a resolution when an image is transmitted and to control in such a manner as to have a resolution with a small power consumption.

A moving picture encoding will be described below by way of example. The encoding mode includes a fixed intraframe encoding mode and an intraframe/interframe adaptive encoding mode and it is effective to reduce a power consumption to select the fixed intraframe encoding mode. Alternatively, in the intraframe/interframe adaptive encoding mode, it is effective to reduce a power consumption by increasing the frequency of the intraframe adaptive encoding.

When the interframe encoding is carried out, it is effective to reduce a power consumption to provide means for executing a motion compensation based on a block matching and reduce the number of searched motion vectors for every block in the block matching. Alternatively, it is also effective to reduce a power consumption to provide means for controlling a frame rate of a transmitted image with respect to the moving picture encoding and to reduce the frame rate.

When both of image and sound communication can be executed, if a communication of only sounds is executed with a priority, then it is possible to save an electric power and also to prevent data from being lost abruptly.

In a communication terminal apparatus which is capable of transmitting and receiving color image information, to transmit and receive black and white image information is effective in reducing a power consumption.

When receiving an encoding mode switching request, the codec means may switch the encoding mode at the frame dividing point, the slice dividing point, or the block dividing point for block matching just after the encoding mode switching request.

If a power consumption is reduced when a battery remaining amount becomes smaller, then a user is cautioned, and at the same time, a remaining conversation time can be prolonged. Also, if an optimum encoding system is selected based on a battery remaining amount and a desired conversation time, then it is possible to use an encoding system with a highest quality of picture in a range in which a conversation time does not become shorter than the desired conversation time.

BEST MODE FOR CARRYING OUT THE INVENTION

FIG. 1 is a block diagram showing a fundamental example of a multimedia communication terminal 100. This terminal has a function to carry out a two-way communication concerning a moving picture, sounds and data, and supplies an electric power to a circuit section 128 of a main unit by a storage battery 127. Battery power remaining information 132 detected by a battery remaining amount detector 131 is supplied to an encoding mode control section 133. This encoding mode control section 133 judges a proper encoding mode based on battery power remaining information or the like, and supplies encoding mode control information 134 to a video/audio codec 110. Also, similarly, a clock signal is supplied from a clock generating circuit 129 to the whole of the circuit unit of the main unit. An image signal is inputted to the multimedia terminal from a camera 101 and an audio signal is inputted to the multimedia terminal from a microphone 102, and the video and audio signals are converted by analog/digital converters 106, 107 into digital signals, respectively. The digital signals are supplied to a video/ audio codec circuit 110, and encoded by an encoding section 111. A video encoded bit stream obtained from a video encoder 112 is supplied to a multiplexing circuit 121. Similarly, the audio signal is encoded by an audio encoder 115, and supplied to the multiplexing circuit 121 as an audio encoded bit stream. The multiplexing circuit 121 further multiplexes three signals to which the output signal from the data input and output unit 105 is added. A multiplexed signal output (output from the multiplexing circuit 121) is outputted through a channel encoder 123 to the channel as a transmission signal 125.

On the other hand, a reception signal 126 from the channel is supplied through a channel decoder 124 to a demultiplexing circuit 122, in which it is separated into a video encoded bit stream, an audio encoded bit stream and a data signal. The audio and video encoded bit streams are supplied to a decoder section 116. The video encoded bit stream is decoded by a video decoder 117. The digital decoded image thus decoded herein is supplied through a digital/analog converter 108 and displayed by a display 103. Similarly, the audio encoded bit stream is decoded by the audio decoder 120 as a digitized decoded audio signal, and outputted from the loudspeaker 104 through a digital/analog converter 109. A data signal 130 is supplied to the data input and output unit 105, and then outputted to a data processing apparatus such as a personal computer.

Figure 2:
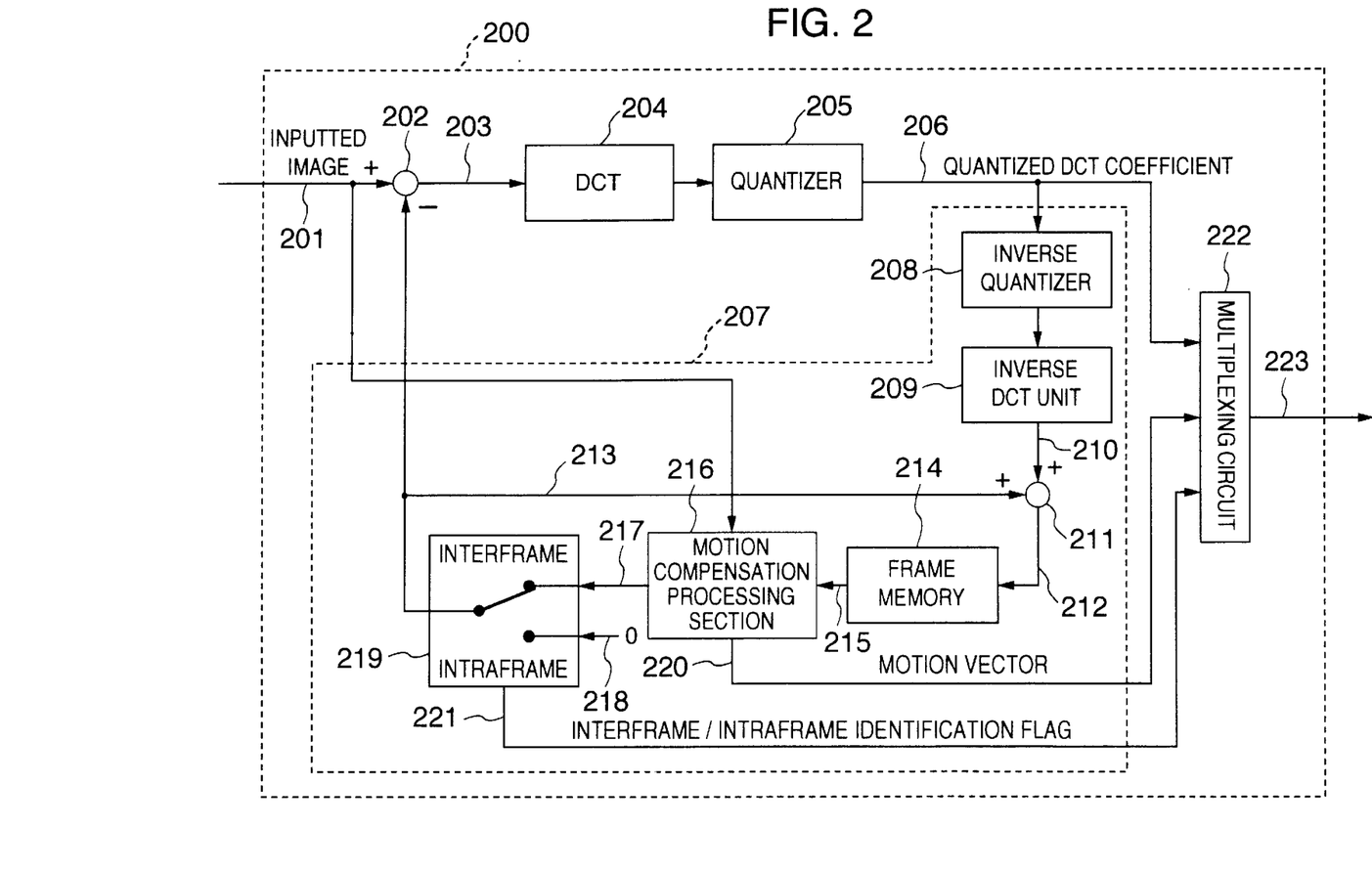
FIG. 2 is a block diagram showing an example of an H. 261 video encoder.

As an example of the video encoder 112 in FIG. 1, FIG. 2 illustrates an H. 261 encoder 200 which is an international standard of a communication moving picture encoding system. The H. 261 uses as the encoding system a hybrid encoding system (intraframe/interframe adaptive encoding system) which is a combination of a motion compensation prediction and a DCT (discrete cosine transform).

This hybrid encoding system will hereinafter be described with reference to FIG. 2. A subtractor 202 calculates a difference between an inputted image (original image of present frame) 201 and an outputted image 213 (which will be described later on) of an intraframe/interframe encoding change-over switch 219, and then outputs an error image 203. This error image is transformed by a DCT transform unit 204 into a DCT coefficient, and quantized by a quantizer 205, thereby being outputted as a quantized DCT coefficient 206. This quantized DCT coefficient 206 is outputted to the channel as transmission information and also used within the encoder in such a manner that the interframe prediction processing unit 207 synthesizes prediction images. The manner in which prediction images are synthesized will be described next. The above-mentioned quantized DCT coefficient 206 is processed by an inverse quantizer 208 and an inverse DCT transform unit 209 as a decoded error image 210 (the same image as the error image reproduced on the reception side), and added with the output image 213(which will be described later on) from the intraframe/interframe encoding changeover switch 219 by an adder 211, thereby being outputted as a present frame decoded image 212 (the same image as the present frame image reproduced on the reception side). This image is temporarily stored in a frame memory 214 and thereby delayed by a time of one frame. Accordingly, at the present time point, the frame memory 214 outputs a preceding frame decoded image 215. This preceding frame decoded image and the present frame inputted image 201 are inputted to the motion compensation processing section 216, in which they are processed in an interframe prediction called a block matching. In the block matching, an image is separated into a plurality of blocks and the portion which is most similar to the original image of the present frame is extracted from the preceding frame decoded image at every block, thereby a present frame prediction image 217 being synthesized. At that time, it is necessary to carry out a processing (motion estimation processing) for detecting how much each block is moved between the preceding frame and the present frame. A motion vector 220 of every block detected by the motion estimation processing is transmitted to the reception side. The reception side can synthesize the same prediction image as that independently obtained on the transmission side from this motion vector and the preceding frame decoded image. The prediction image 217 is inputted to the intraframe/ interframe encoding change-over switch 219 with a "0" signal 218. This switch changes-over the interframe encoding and the intraframe encoding by selecting either of the two inputs. When the prediction image 217 is selected (FIG. 2 shows this case), there is carried out the interframe encoding. On the other hand, when the "0" signal is selected, the inputted image is DCT-encoded as it is and then outputted to the channel so that the intraframe encoding is executed. In order for the reception side to correctly obtain the decoded image, it is necessary to detect whether the interframe encoding or the intraframe encoding is carried out on the transmission side. To this end, an identification flag 221 is outputted to the channel. A final H. 261 encoded bit stream 223 is obtained by multiplexing the quantized DCT coefficient, the motion vector and information of intraframe/interframe identification flag in the multiplexing circuit 222.

According to the H. 261, the intraframe/interframe encoding is independently selected at every block. The encoder may freely select the intraframe/interframe encoding, and it is customary that the intraframe encoding or the interframe encoding with a higher coding efficiency is selected in response to the nature of the inputted image. In general, when a correlation between successive frames is low due to a scene change or the like, it is said that a coding efficiency is made higher by selecting the intraframe coding.

Figure 3:
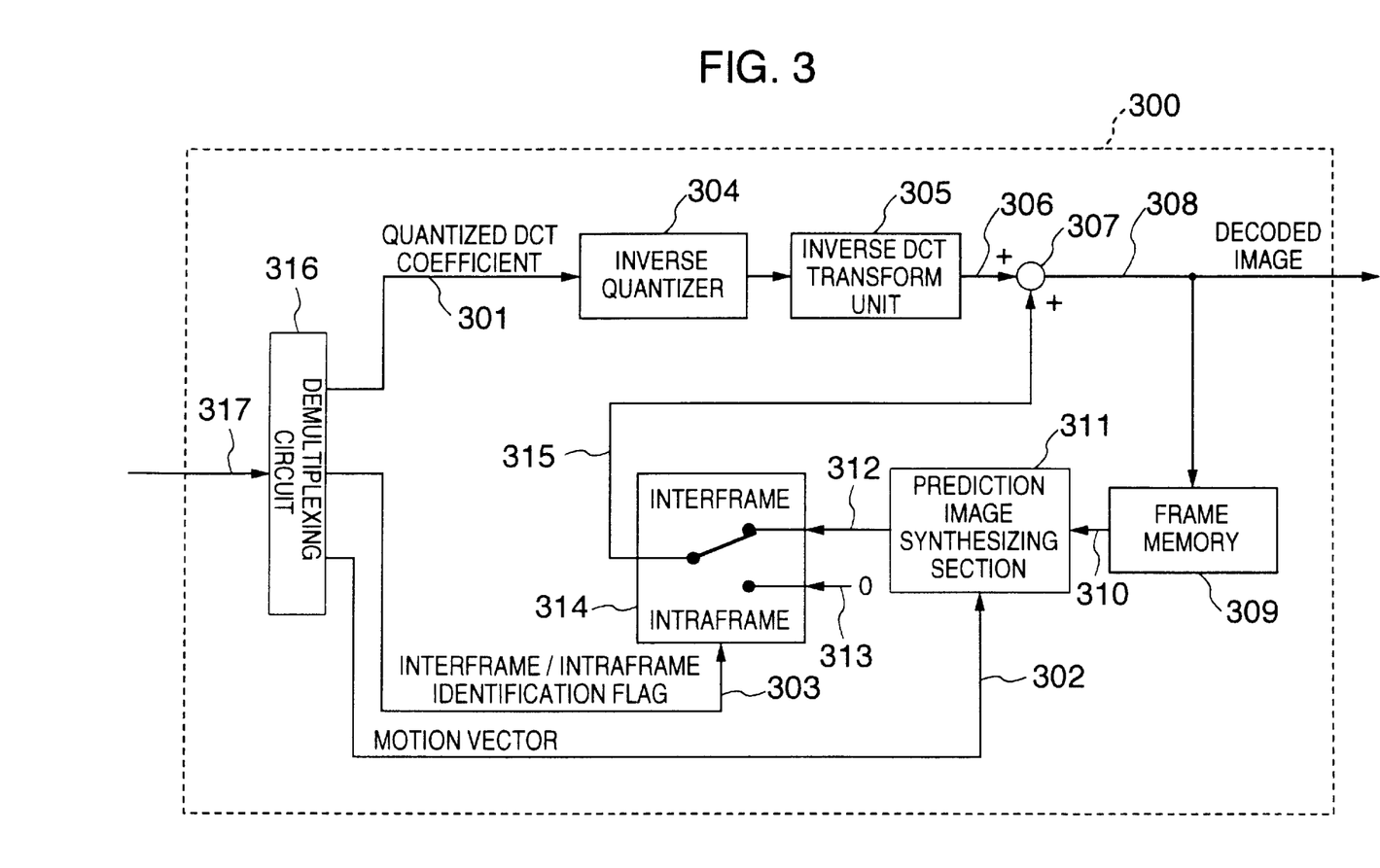
FIG. 3 is a block diagram showing an example of an H. 261 video decoder.

FIG. 3 shows an example of a decoder 300 (corresponding to the decoder 117 in FIG. 1) which receives the encoded bit stream outputted from the encoder of FIG. 2. A received H. 261 bit stream 317 is separated by a demultiplexing circuit 316 into a quantized DCT coefficient 301, a motion vector 302 and an intraframe/interframe identification flag 303. The quantized DCT coefficient 301 is processed by an inverse quantizer 304 and an inverse DCT transform unit 305, and outputted as a decoded error image 306. This error image is added with an output image 315 of the intraframe/interframe encoding change-over switch 314 by an adder 307, and then outputted as a decoded image 308. The intraframe/ interframe encoding change-over switch switches outputs in accordance with the intraframe/interframe encoding identification flag 303. A prediction image 312 used when the interframe encoding is carried out is synthesized by a prediction image synthesizing section 311. A preceding frame decoded image 310 stored in a frame memory 309 is processed in such a manner that the position is moved at every block in accordance with the received motion vector 302. On the other hand, in the case of the intraframe encoding, the intraframe/interframe encoding change-over switch 314 outputs a "0" signal 313 as it is.

At present, it is frequently observed that the video encoder and decoder shown in FIGS. 2 and 3 are realized by using special chips having circuits specialized in processing the respective units. On the other hand, as a new form used instead of the conventional video encoding and decoding apparatus using the special chips, an encoding/decoding apparatus (software codec) based on a software using a general-purpose CPU receives an attention recently. Since the software codec has less time and labor for developing apparatus and also has features to cope with variations of functions and performance with a flexibility, it is expected that the number of software codecs will increase as a general-purpose CPU becomes higher in processing speed.

Figure 4:
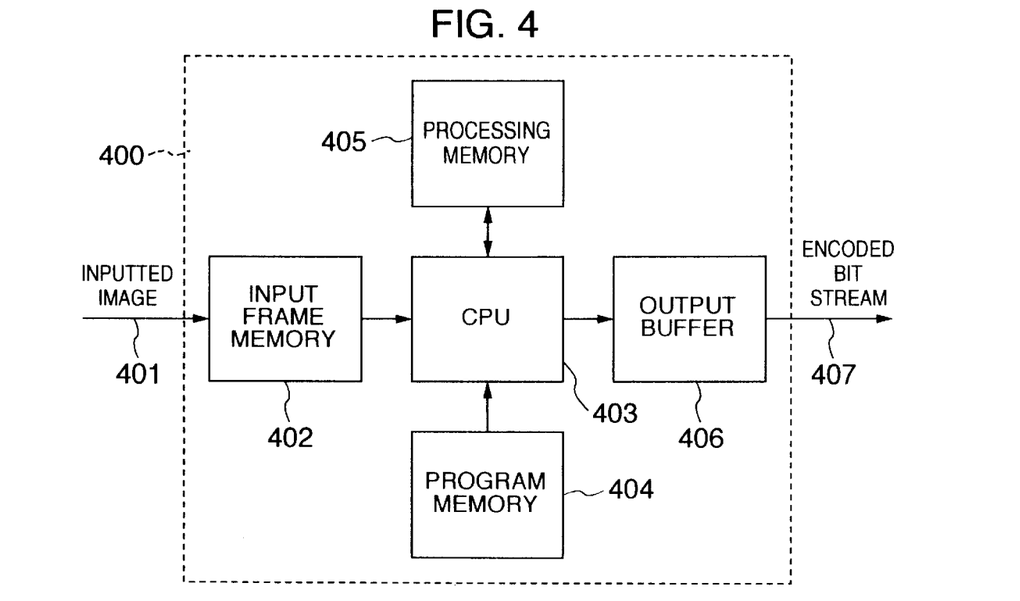
FIG. 4 is a block diagram showing an example of a software video encoder.
Figure 5:
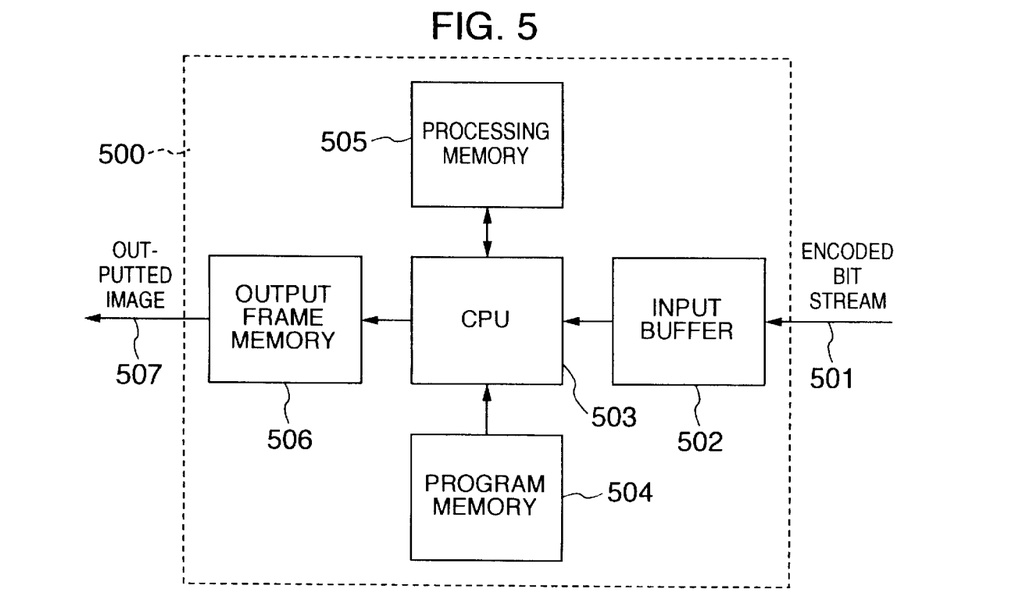
FIG. 5 is a block diagram showing an example of a software video decoder.

FIGS. 4 and 5 show examples of software encoder 400 and decoder 500 for moving picture, respectively. 400 and 500 correspond to 112 and 117 in FIG. 1, respectively. In the software encoder 400, an input image 401 is stored in an input frame memory 402, and a CPU 403 reads out information therefrom and encodes the same. A program for driving this CPU is stored in a program memory 404. Also, the CPU executes an encoding processing by effectively utilizing a processing memory 405. Encoding information outputted from the CPU is temporarily stored in an output buffer 406, and then outputted as an encoding bit stream 407.

On the other hand, in the software decoder 500, an inputted encoding bit stream 501 is temporarily stored in an input buffer 502 and read by a CPU 503. The CPU executes a decoding processing by effectively utilizing a program memory 504 and a processing memory 505. A resultant decoded image is temporarily stored in an output frame memory 506, and then outputted as an outputted image 507.

Figure 6:
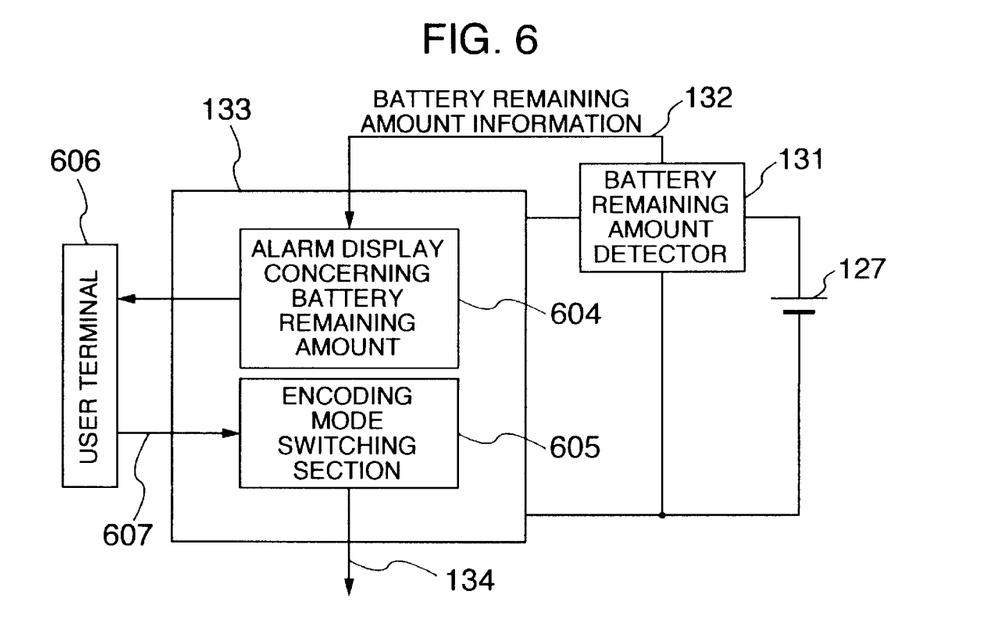
FIG. 6 is a block diagram showing an example of a multimedia communication terminal of which the encoding mode is switched by a terminal user.
Figure 7:
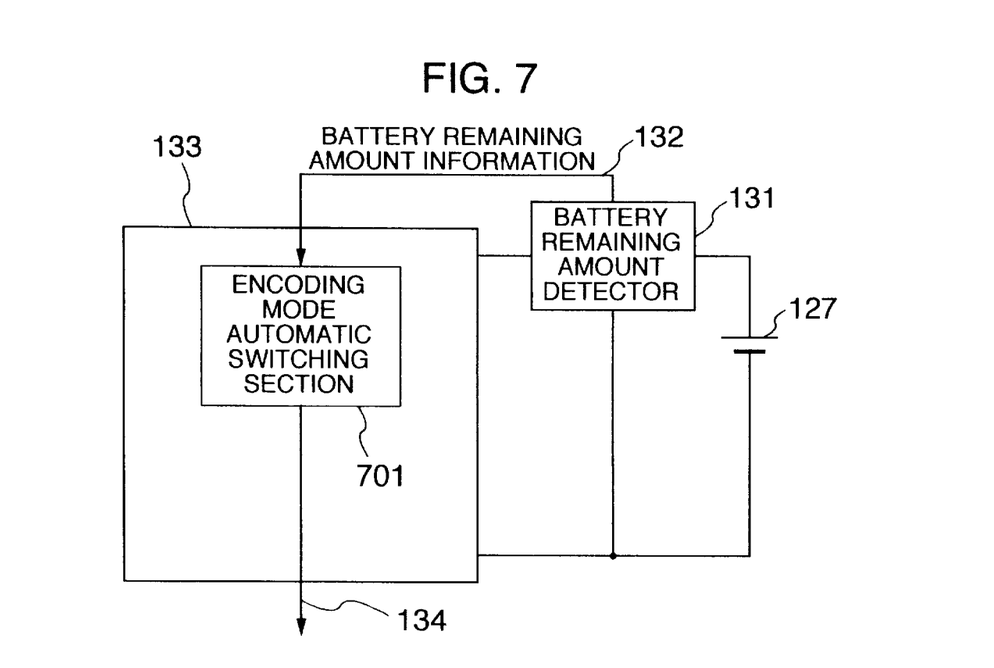
FIG. 7 is a block diagram showing an example of a multimedia communication terminal of which the encoding mode is switched automatically.
Figure 8:
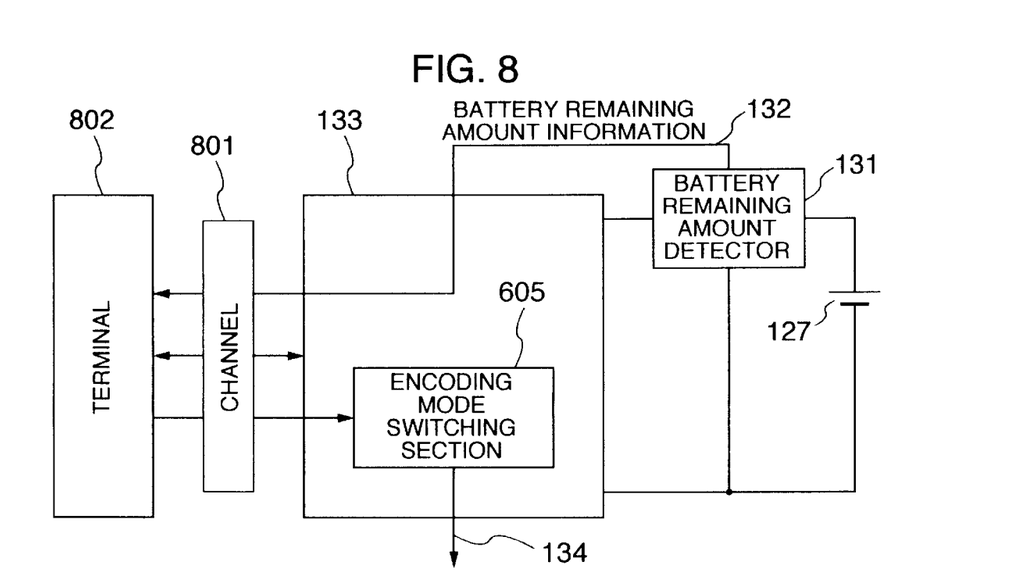
FIG. 8 is a block diagram showing a multimedia communication terminal of which the encoding mode is switched by those to whom communication is made.

Examples of portions in which the multimedia communication terminal shown in FIG. 1 controls the encoding mode in response to the remaining amount of electric power are illustrated in FIGS. 6, 7 and 8. Hereinafter, the same references in the sheets of the drawings identify the same elements and parts.

In the arrangement shown in FIG. 6, a battery remaining amount detecting section 131 detects a residual electric power amount of the battery 127, and transmits the detected residual electric power amount to an encoding mode control section 133 as battery remaining amount information 132. When this information 132 is information indicative of the fact that the battery remaining amount of the battery 127 is lower than a certain constant value, an alarm display control section 604 configuring the encoding mode control section 133 generates an alarm to a terminal user 606. As a means for transmitting an alarm, there might be considered a display such as an alarm message, an alarm symbol on display for visually appealing the terminal user and an alarm such as beep sounds or synthesized sounds for appealing to the ear of the terminal user. Also, it is effective that the arrangement of FIG. 1 further includes an alarm lamp to flush to caution the terminal user. Thus, when the terminal user detects that the battery remaining amount becomes small, the terminal user is able to change the encoding mode by changing-over the switch. When receiving switching information 607, an encoding mode switching section 605 switches the encoding mode in accordance with an instruction from the terminal user. When the terminal user switches the encoding mode, with respect to each encoding mode, it is possible to display auxiliary information such as continuous communication time which are expected when a communication is continued in that mode. A specific method for switching the encoding mode will be described later on.

While the user switches the encoding mode in the terminal of FIG. 6, the terminal shown in FIG. 7 is characterized in that an encoding mode automatic switching section 701 automatically switches the encoding mode in response to the battery remaining amount information. At that time, the terminal user can freely program in advance the encoding mode in accordance with the level of the battery remaining amount. Also, the terminal user can select a desired one from a plurality of patterns that are programmed in advance. As an automatic control method, there might be generally considered a system in which the encoding mode is moved to a low power consumption/low quality mode as the battery remaining amount decreases. Thus, there can be expected effects such as preventing a communication from being suddenly stopped when a battery has run down.

FIG. 8 shows an example of a system in which an encoding mode of a terminal which transmits information is controlled by a terminal 802 of the called party through a channel 801. In a surveillance system using a surveillance camera or the like, there might be considered the case in which an encoding mode of a camera is controlled in a remote operation fashion. Also, if there are a number of surveillance cameras, then it is possible to simplify the arrangement of each surveillance camera by intensively controlling the encoding mode with the terminal of the reception side.

The power consumption control systems based on the encoding mode switching shown in FIGS. 6, 7, 8 can also be effective when a storage battery is not used as an electric power source in particular. In the surveillance system having a number of surveillance cameras, for example, in order to suppress a total power consumption of all surveillance cameras, there might be considered the system in which an encoding mode of a camera which does not transmit important information, in particular, is moved to a low quality/low power consumption mode.

A specific method of switching the encoding mode will be described next. It is assumed that the H. 261 encoder and decoder shown in FIGS. 2 and 3 are used as the video encoder 112 and decoder 117 of the multimedia communication terminal 100 shown in FIG. 1. For example, as the moving picture encoding modes, the following four modes are prepared:

(1) Transmission and reception based on interframe/intraframe adaptive encoding:

(2) Reception is the same as (1) and transmission has only the intraframe encoding:

(3) Reception is the same as (1) and transmission is not made; and (4) Image is neither transmitted nor received.

Figure 9:
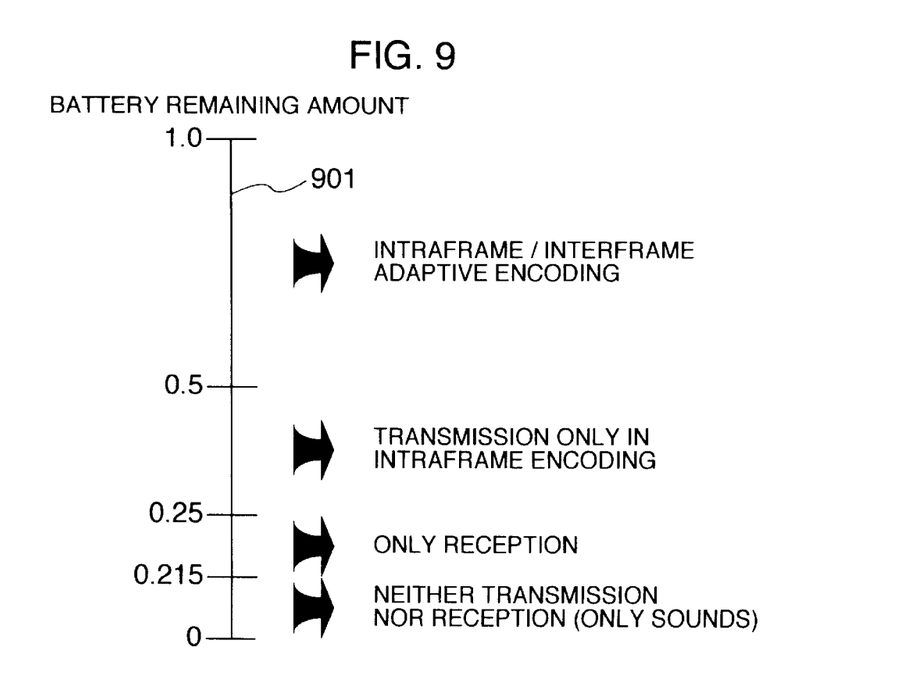
FIG. 9 is a diagram illustrative of the manner in which the encoding modes will be changed in accordance with the remaining power amount of the battery.

In this case, when the encoding mode (1) is used, all portions in the video/audio codec circuit are operated. When the encoding mode is switched from (1) to (2), the interframe prediction processing section 207 becomes disabled. Then, when the encoding mode becomes (3), the remaining portions of the video encoder 200 become disabled. Finally, when the encoding mode becomes (4), further the video decoding section 117 becomes disabled, and the transmission and reception of video information are all stopped. As the number of the encoding mode increases, the disabled portions become large so that the power consumption becomes small. However, on the contrary, as the encoding mode has small power consumption, the quality of transmitted information is lowered. FIG. 9 shows an example of a relationship between the encoding mode and the battery remaining amount of this system. Reference numeral 901 denotes a graph showing battery remaining amounts obtained when the battery remaining amount (electric power×time) presented under the condition that the battery is fully charged is set to 1.0 and the battery remaining amount obtained when the battery remaining amount under the condition that the battery becomes disabled is set to 0.0. When the battery remaining amount becomes less than 0.5, for example, the encoding mode is changed from (1) to (2). To simplify the processing, it is suitable that a timing at which the encoding mode is switched is set to a first frame dividing point obtained immediately after the battery remaining amount becomes lower than a predetermined value. If it is intended to fine control the power consumption, then there might be a method in which this switching point is set to a dividing point of blocks for block matching or a dividing point of a slice (column of blocks horizontally extended from end to end of image for block matching). In these dividing points, independent processing can be carried out for the preceding and succeeding units for processing (frame, slice, block) so that the encoding mode can be switched with ease. When the user switches the encoding mode, it is suitable to switch the encoding mode from the dividing points of frame, block, slice presented immediately after a similar switching request is issued.

In the example of FIG. 9, it is possible to further fine control the power consumption by changing parameters concerning the encoding in the respective encoding modes. In the encoding mode (1), for example, the frame rate of the transmitted image should be lowered. Then, it becomes possible to relatively decrease a time in which the video encoding section is operated. As a consequence, it is possible to decrease the power consumption. FIG. 10 shows this state.

Figure 10:
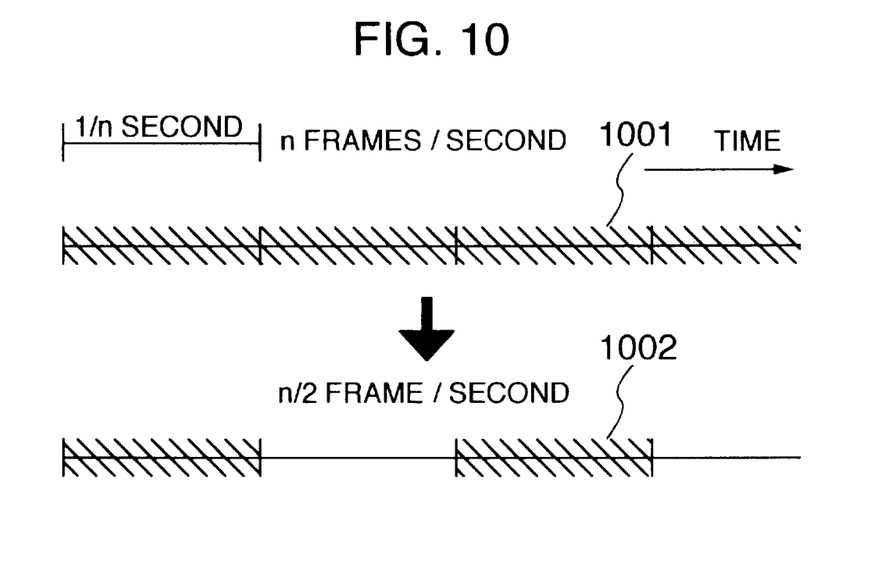
FIG. 10 is a diagram illustrative of the manner in which an image is encoded when a frame rate is changed.

1001 shows the manner in which the encoding section is operated when the encoding is carried out at n frames/second. A portion shown hatched indicates a time during which the encoding section is operated. On the other hand, 1002 shows the manner in which the encoding section is operated when the encoding is carried out at n/2 frame/second. Since the processing of every frame is ended at 1/n second, the video encoding section can be placed into the stop state during 1/n second at every 1/n second. A similar control can be carried out by changing the resolution (number of pixels) of an image.

Except the frame rate and the resolution, a frequency at which the intraframe encoding is selected in the interframe/intraframe adaptive encoding can be used as a parameter. When the frequency at which the intraframe encoding is selected is raised, it becomes possible to relatively decrease the time during which the interframe prediction section is driven. Thus, a power consumption can be decreased. Also, in order to decrease a power consumption, it is effective to narrow a motion vector search range used when a block matching is carried out in the interframe encoding. Further, when a terminal which transmits or receives a color image transmits or receives a black and white image, a circuit or memory which handles color difference signals can be disabled. Further, even when a bit stream in which a color image is encoded is received, similar effects can be achieved by reproducing only black and white information. However, to lower the frame rate and the resolution, to raise the frequency at which the intraframe encoding is selected, and to narrow the searching range of the block matching all lead to the deterioration of an image decoded on the reception side.

Figure 11:
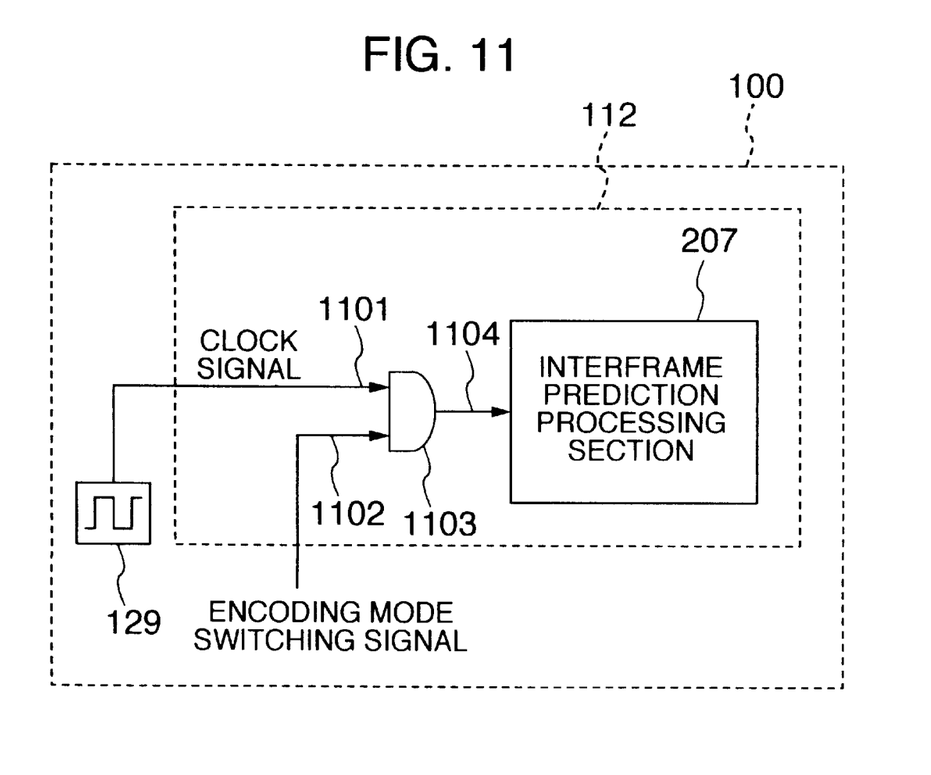
FIG. 11 is a block diagram showing an example of a circuit which puts an interframe prediction section into the stop condition by ceasing the supply of a clock signal.

The manner in which a control is made from a circuit standpoint when a power consumption of a disabled circuit is decreased will be described below. As a direct method of preventing the disabled circuit from consuming an electric power, there is a method of stopping the supply of an electric power by using a power transistor. Although this method is effective, when the whole of the circuit is integrated, the power transistor occupies a large area, resulting in a problem. Therefore, there is considered a method of stopping a clock signal. FIG. 11 shows an example of a circuit which switches the operating state of the interframe prediction section by stopping the supply of the clock signal. In the multimedia communication terminal 100 of FIG. 1, the H. 261 encoder 200 shown in FIG. 2 is used as the video encoder 112. In this circuit, a clock signal 1101 generated by the clock signal generator 129 is supplied through an AND circuit 1103 to a clock input 1104 of the interframe prediction processing section 207. An encoding mode switching signal 1102 is supplied from the encoding mode switching section 605 in FIGS. 6 and 8 or the encoding mode automatic switching section 701 in FIG. 7. when the encoding mode switching signal is set to "1", the clock signal reaches the interframe prediction section. Whereas, when the encoding mode switching signal is set to "0", the clock signal is not supplied. Since the clock signal is not supplied, the interframe prediction section is placed in the stop state. As a consequence, it becomes possible to suppress the power consumption of this portion.

Figure 12:
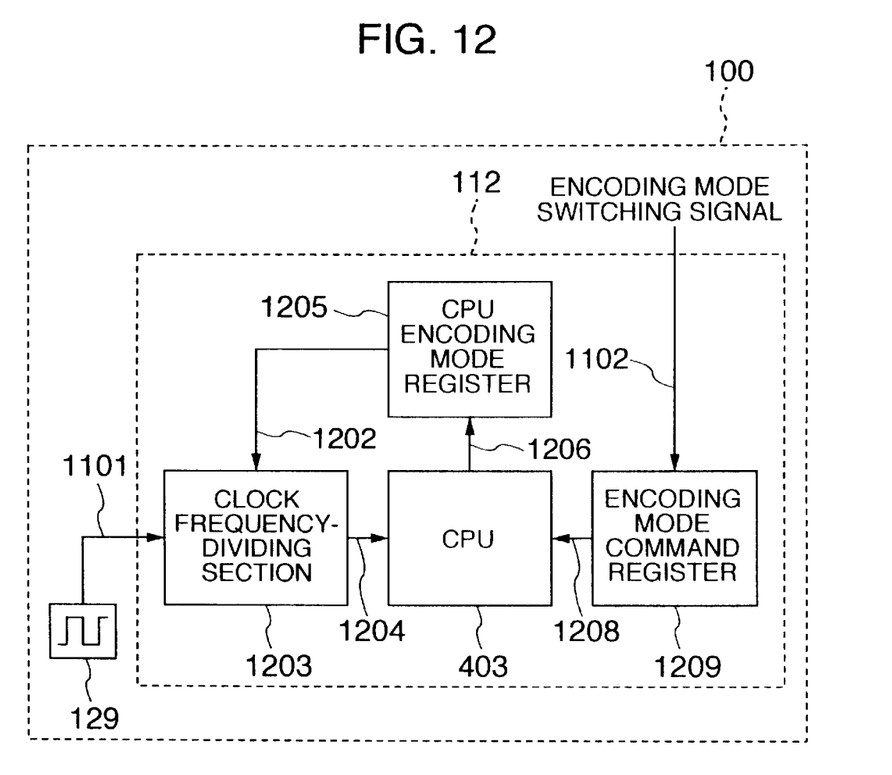
FIG. 12 is a block diagram showing an example of circuits disposed around a CPU of a software codec which controls the power consumption by varying a clock frequency.

On the other hand, in the software codec, since most of the image encoding and decoding is executed by the CPU, it is difficult to use a method which controls a power consumption by stopping the disabled circuit. Therefore, there is considered a method of controlling a frequency of a clock signal which is supplied to the CPU. To lower the frame rate, to raise the frequency of the intraframe encoding, to stop the transmission of image signal and to stop the reception of image signal lead to the decrease of the processing amount of the CPU in the software codec. Accordingly, even when the clock frequency is lowered by the decreased processing amount, there can be maintained a real time property of the processing. In general, it is known that a power consumption of a general-purpose CPU decreases as a frequency of an operation clock is lowered. Therefore, to control the clock frequency leads to the control of the power consumption. FIG. 12 shows an example of a clock control circuit in a software encoder which switches a CPU clock in response to the encoding mode. In the multimedia communication terminal 100 of FIG. 1, there is used the software encoder 400 shown in FIG. 4 as the video encoder 112. An encoding mode switching signal 1102 changes a state of an encoding mode command register 1209. content 1208 of the encoding mode command register can be read out by a CPU 403 when a certain specific memory address is read out. As mentioned earlier, since the switching points at which the encoding modes are switched are limited (the above-mentioned frame, slice and block dividing points), the CPU may read the content of the encoding mode command register immediately before the processing of the switching point is carried out. The CPU detects on the basis of the content of the encoding mode command register that the encoding mode switching command is issued, and switches the encoding mode at a certain switching point. Incidentally, the encoding mode switching request processing for the CPU can be attained by interrupting the CPU. The CPU which switches the encoding mode writes a CPU encoding mode 1206 in a CPU encoding mode register 1205 in order to announce the present encoding mode of the CPU itself to external circuits. A clock frequency-dividing section 1203 reads the content 1202 of the CPU encoding mode register, and controls a frequency-dividing ratio (ratio in which a frequency is lowered) of a clock signal 1101 generated by the clock signal generator 129 in response to the encoding mode of the present CPU. In this way, the frequency of the clock signal 1204 supplied to the CPU is controlled in response to the encoding mode. Incidentally, the processing of that portion can be realized by controlling the oscillation frequency itself of the clock with a VCO (Voltage Controlled Oscillator).

The system for controlling the clock signal as described above can be applied to also an apparatus using a special chip. When a frame rate is lowered, for example, it is possible to decrease a power consumption by lowering an operation clock of the encoding apparatus itself without using the system shown in FIG. 10.

In the present specification, the change in the same encoding system (e.g., H. 261) is handled as the change of the encoding mode. However, it is clear that to change the encoding system itself (for example, the change from MPEG1 to H. 261) also is similarly included in the framework of the present invention as the change of the encoding mode.

INDUSTRIAL APPLICABILITY

According to the present invention, it is possible to decrease the amount of electric power consumed by a terminal by intentionally lowering the quality of encoded information which is transmitted by a terminal. A communication terminal apparatus of the present invention is useful for a portable communication terminal apparatus using a storage battery, for example, a video surveillance apparatus whose main object is an image transmission continuous time while suppressing a power consumption, etc.

We claim:

1. In a communication terminal apparatus in which inputted video or audio information is encoded and outputted to a channel and video or audio information obtained from said channel is decoded, said communication terminal apparatus characterized by input means for inputting video or audio information, channel control sections for outputting said inputted information and receiving information from said channel, output means for outputting information obtained from said channel in the form of image or sounds, a codec means disposed among said input means, said output means and said channel control sections for encoding said inputted information and decoding information inputted from said channel in accordance with any encoding mode of a plurality of encoding modes with different power consumption upon execution and a control section for controlling the selection of said encoding mode.

2. In a communication terminal apparatus as claimed in claim 1, said communication terminal apparatus further comprising a supply means for supplying electric power to the whole of the apparatus and in which said control section controls the selection of said encoding mode in response to a battery remaining amount of said supply means.

3. In a communication terminal apparatus as claimed in claim 2, said communication terminal apparatus characterized in that said control section outputs video or audio message by using said output means in response to a battery remaining amount of said supply means and controls the selection of said encoding mode in response to a control signal inputted to said message.

4. A communication terminal apparatus as claimed in claim 2, in which said supply means includes a storage battery and a means for detecting a remaining battery amount of said storage battery, and said control section switches the encoding mode to a different encoding mode corresponding to a low power consumption as compared with a power consumption required by a present encoding mode when information indicative of a battery remaining amount smaller than a previously-determined battery remaining amount is supplied to said control section.

5. A communication terminal apparatus as claimed in claim 3, in which said message includes a successive communication possible time in said encoding mode.

6. A communication terminal apparatus as claimed in claim 1, characterized in that the supply of a clock of a whole apparatus to unnecessary circuits is stopped by selectively switching said encoding mode.

7. A communication terminal apparatus as claimed in claim 1, in which a frequency of a clock supplied to the whole of apparatus is changed in response to a processed amount of said encoding mode.

8. In a communication terminal apparatus as claimed in claim 1, said communication terminal apparatus further comprising a supply means for supplying an electric power to the whole of apparatus, and in which said control section lowers a resolution of said inputted information when a battery amount of said supply means becomes smaller than a predetermined amount.

9. In a communication terminal apparatus as claimed in claim 2, said communication terminal apparatus characterized in that said plurality of encoding modes include a mode for carrying out a fixed intraframe encoding and a mode for carrying out an intraframe/interframe adaptive encoding concerning a moving picture encoding.

10. In a communication terminal apparatus as claimed in claim 9, said communication terminal apparatus characterized in that said control section selects said fixed intraframe encoding mode as said encoding mode in response to the decrease of the battery remaining amount of said supply means.

11. In a communication terminal apparatus as claimed in claim 9, said communication terminal apparatus characterized in that said control section increases a frequency at which an intraframe encoding in said intraframe/interframe adaptive coding is selected in response to the decrease of the battery remaining amount of said supply means when the mode for carrying out said intraframe/interframe adaptive encoding is selected as a present encoding mode.

12. In a communication terminal apparatus as claimed in claim 2, said communication terminal apparatus characterized in that said codec means includes a means for executing an interframe coding concerning a moving picture encoding and a means for executing a motion compensation based on a block matching, and said control section reduces the number of searched motion vectors at every block in said block matching in response to the decrease of the battery remaining amount of said supply means.

13. In a communication terminal apparatus as claimed in claim 2, said communication terminal apparatus characterized in that said codec means includes a means for executing an interframe coding concerning a moving picture encoding and a means for controlling a frame rate of an image to be transmitted, and said control section lowers said frame rate in response to the decrease of the battery remaining amount of said supply means.

14. In a communication terminal apparatus as claimed in claim 2, said communication terminal apparatus characterized in that said control section performs a communication only by sounds in response to the decrease of the battery remaining amount of said supply means.

15. In a communication terminal apparatus as claimed in claim 2, said communication terminal apparatus characterized in that said control section transmits video information inputted from said input means in the form of a black and white image in response to the decrease of the battery remaining amount of said supply means.

16. In a communication terminal apparatus as claimed in claim 2, said communication terminal apparatus characterized in that said control section decodes image information received from said channel as black and white image information in response to the decrease of the battery remaining amount of said supply means.

17. In a communication terminal apparatus as claimed in claim 16, said communication terminal apparatus characterized in that said control section reproduces a black and white image except color information from a bit stream which encodes a color image received from a channel.

18. In a communication terminal apparatus as claimed in claim 2, said communication terminal apparatus characterized in that said codec means switches an encoding mode from a frame dividing point provided immediately after said codec means receives an encoding mode switch request signal from said control section.

19. In a communication terminal apparatus as claimed in claim 2, said communication terminal apparatus characterized in that said codec means switches an encoding mode from a slice dividing point provided immediately after said codec means receives an encoding mode switch request signal from said control section.

20. In a communication terminal apparatus as claimed in claim 2, said communication terminal apparatus characterized in that said codec means switches an encoding mode from a dividing point of blocks for block matching provided immediately after said codec means receives an encoding mode switch request signal from said control section.

* * * * *